3,106,343
MEANS FOR CONTROLLING THE TEMPERATURE OF AN INTERNAL COMBUSTION ENGINE
Joseph R. Holland, 512 Newark Road, North Hykeham, Lincoln, England
Filed June 9, 1961, Ser. No. 115,984
Claims priority, application Great Britain June 23, 1960
2 Claims. (Cl. 236—35)

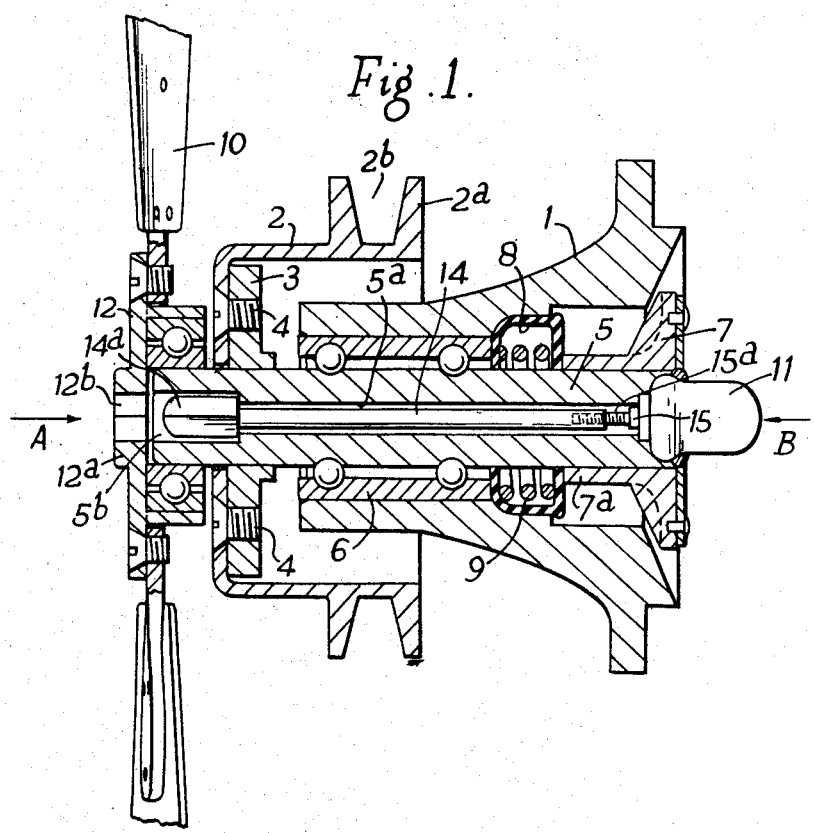

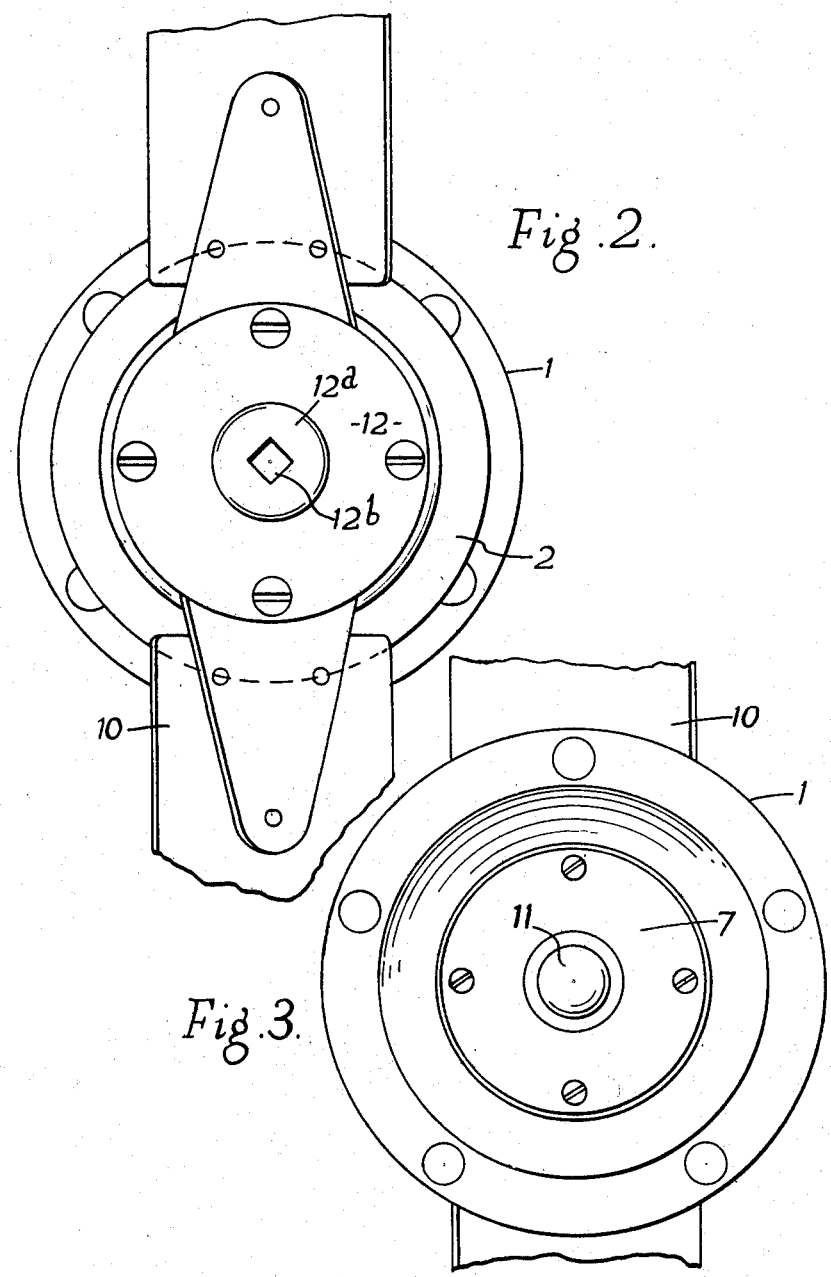

This invention appertains to water-cooled internal combustion engines for road vehicles, and has reference particularly to such engines of the kind wherein a water pump has associated therewith a fan for distributing cooling air around the engine.

In an internal combustion engine of this kind, the impeller spindle of the water pump, i.e. the shaft to which the water impeller or pump rotor is secured, is rigidly connected to a pulley which is adapted to be driven from the engine through the medium of a belt, and the fan is driven by or from the rotating parts.

Now for efficient running of the internal combustion engine of a road vehicle, the ambient temperature around and through the engine should ideally, be maintained at anything from, say, 70°–85° C. However, road vehicle engines tend to run too hot in the congested traffic conditions increasingly met within built-up areas in this country. Moreover, in the naturally hot or cold climate conditions of certain countries overseas, internal combustion engines easily become either over-heated or too cool for efficient running.

It has for some time been realised that a measure of control of engine temperature can be exercised by controlling the fan so as to vary the flow of air over the engine. It has previously been proposed to vary the operation of the fan by automatic variations in the pitch of the fan blades commensurate with variations in the engine temperature. Some of these prior proposals, however, have involved mechanisms of somewhat complicated constructions which are found to be too expensive for mass production methods.

The object of the present invention is to provide, in or for an internal combustion engine of the kind herein referred to, a self-contained combined water pump and fan assembly of simple construction which is relatively inexpensive to produce, and is designed to automatically control the fan with the aim of maintaining the engine temperature constant.

In the combined water pump and fan assembly of this invention the fan is arranged to be driven either from the aforesaid impeller spindle or from the engine-driven pulley through the medium of a clutch, and means responsive to conditions affected by engine temperature are provided to automatically control the said clutch in such a manner that, with the engine running, the fan is automatically brought into or taken out of operation depending upon whether the engine exceeds or falls to a predetermined temperature respectively.

It has been found that in normal running of the engine, i.e. running fairly constantly at a medium speed with the road vehicle to which the engine is applied moving at a speed commensurate with the engine speed, the air flowing over the engine, as a result of the ram effect during travel of the vehicle, is sufficient to effect cooling of the engine and no additional impetus need be given to the inflowing air as a consequence of which the fan need not be in operation. Thus, the idea of the present invention is that the air flowing in as a result of the ram effect will be solely relied upon to cool the engine during normal running, with the fan quiescent, but that the fan shall be automatically brought into operation to increase the flow of air when the temperature of the engine rises excessively, e.g. in slow running conditions.

One advantage of the arrangement according to this invention, in which the fan is stationary during normal running of the engine, is that the noise created by a rotating fan is eliminated during such normal running.

The means for controlling the clutch may be constituted by a temperature-responsive device so arranged that water from the cooling system can flow around it. Such a temperature-responsive device may, for instance, be in the form of a thermostat of the bellows type such as is commonly incorporated in the water cooling radiator of a road vehicle and which opens out upon a rise of temperature and closes up whenever the temperature falls. It is, however, preferably the intention to employ a temperature-responsive device in the form of a wax-filled thermostat pod. Such a pod customarily comprises a brass or equivalent housing which contains a wax which is expansible under the influence of heat, and, surrounded by said wax, a rubber or like sac in which is located one end of a plunger or similar member adapted to be projected from and withdrawn into the housing through the medium of the rubber or like sac upon expansions and contractions of the wax respectively. The inner end of the plunger or similar member is of such a shape that, upon expansion of the wax, a thrust is exerted on this end of the plunger or similar member to move the latter axially out of the housing.

Alternatively, the means for controlling the clutch may be constituted by a device so arranged that water from the cooling system can flow through or around it, this device being responsive to changes in the pressure in the water system, which pressure, of course, varies with the temperature of the water.

In any event, the clutch controlling device of whatever form may advantageously be adapted to actuate a push rod or shaft which extends co-axially with respect to the bladed impeller of the water pump, the impeller spindle and the rotatable fan, and is axially displaceable for controlling the clutch.

The clutch may be of any appropriate form. For example, a push rod may be rotatable together with, but axially movable relatively to, the impeller spindle, in which instance this push rod and the hub of the fan may be provided with complementary interengageable formations constituting the elements of a dog clutch, whereby the fan can be connected for rotation together with the impeller spindle upon axial displacement of the push rod in one direction and the fan can be disconnected from the said impeller spindle upon movement of the push rod in the reverse direction.

Alternatively, the clutch may be of the friction type and consist, for instance, of opposed friction rings between which the central portion of the fan is arranged to be gripped at appropriate times, these friction rings being rotatable together with the engine-driven pulley and being adapted to be urged into driving engagement with the fan by an axial displacement of a shaft arranged to be under the influence of the aforementioned temperature- or pressure-responsive clutch-controlling device.

In a convenient embodiment of the invention the aforementioned device which is responsive to conditions affected by engine temperature is associated with and arranged to rotate together with, the pump impeller at the back of the assembly so that the device is exposed to and directly in contact with circulating water in the system.

In order that the invention may be more clearly understood and readily carried into practical effect, a specific construction example thereof will now be described with reference to the accompanying drawings, wherein, FIGURE 1 is a vertical sectional view taken longitudinally through one form of the improved thermo-operated water pump fan unit wherein the fan is arranged to be driven at appropriate times from the impeller spindle through the medium of a dog clutch, FIGURES 2 and 3 are front and rear views of the said unit, i.e. as seen in the directions of the arrows A and B in FIGURE 1 respectively.

In FIGURES 1–3, the water pump body is indicated at 1, and the numeral 2 indicates the pulley which is adapted to be driven from the engine. This pulley is formed with the customary flange 2a having therein a V-groove 2b to receive a belt through the medium of which the pulley 2 is driven. The flanged hub 3 to which the hollow body of the pulley 2 is attached by means of screws 4 is rigidly secured upon the impeller spindle 5 of the water pump. The spindle 5 rotates freely within an anti-friction bearing 6 fitted coaxially within the water pump body 1. The bladed pump impeller 7 is rigidly secured upon the inner or rear end of the spindle 5, and a sealing component 8 is interposed between this impeller and the opposed end of the bearing 6. A compression spring 9 arranged to surround the impeller spindle 5 is accommodated within the sealing component 8 and functions to press the opposite end walls of the latter into firm sealing contact with the bearing 6 and the hub 7a of the impeller 7. The spindle 5 and hence also the impeller 7 are driven in the usual way from the engine through the pulley 2 and the belt. Associated with the water pump is a fan 10 for distributing cooling air around the engine.

In accordance with the present invention the fan 10 is arranged to be driven from the impeller spindle 5 through the medium of a clutch, and a thermostat 11, housed at its inner end in a recess formed in the rear end of said spindle, is adapted to automatically control this clutch. As will be seen in FIGURE 1, the fan hub 12 is mounted to turn freely upon an anti-friction bearing 13 which is seated upon the front end of the impeller spindle 5 which end protrudes through the flanged pulley hub 3 to the front of the pulley 2.

The impeller spindle 5 is bored right through axially at 5a from end to end to receive an axially displaceable push rod 14. The forward end of the bore 5a is enlarged at 5b and made of square cross-section to receive a correspondingly enlarged and shaped portion 14a at the front end of the push rod. The enlarged portion 5b of the bore and the corresponding portion 14a of the clutch rod may, however, be of any other appropriate non-circular cross-section. A central portion 12a of the fan hub 12 extends over the front end of the impeller spindle and has formed therethrough a square hole 12b (see FIGURE 2) which complements the enlarged front end portion 14a of the push rod 14. The last mentioned enlarged portion and the hole 12b constitute, in fact, the male and female parts respectively of a simple dog clutch. To facilitate the entrance of the enlarged end portion 14a into the hole 12b at appropriate times, the leading end of the said portion is rounded as shown in FIGURE 1. The thermostat 11 in this example is in the form of a wax-filled pod as hereinbefore described. The plunger 15 associated with the sac of the pod is provided with a screw-threaded portion 15a which is screwed into a tapped hole in the rear end of the push rod.

The construction and arrangement just described are such that the male part 14a of the dog clutch will normally, i.e. during normal running of the engine, be withdrawn from the fan hub 12 and wholly accommodated within the enlarged portion 5b of the bore 5a so that it rotates together with the impeller spindle 5 while the fan is quiescent. When, however, the engine attains a higher temperature and tends to overheat, the thermostat pod 11 will respond to this temperature and its plunger 15 will be projected such as to cause forward axial displacement of the push rod 14 and consequent emergence of the male part 14a of the dog clutch from the impeller spindle 5. As a consequence, this male part will enter the female part 12b of the clutch and so connect the fan 10 with the impeller spindle 5 so that the fan will rotate to distribute cooling air around the engine. When the engine and hence the circulating water has cooled sufficiently, the thermostat 11 will respond, its plunger 15 and the push rod 14 will be retracted rearwardly and hence the complementary parts of the dog clutch will be disengaged to disconnect the fan from the impeller spindle.

Where, in the arrangement herein described, the thermostat 11 is replaced by a device directly responsive to the pressure of the circulating water (and thus only indirectly responsive to the temperature), such a device may be constituted by a diaphragm serving to close a chamber constituted by a cavity or recess in the rotatable impeller, the water in the circulatory cooling system being arranged either to flow through this chamber, or to flow past the diaphragm outside the chamber, whereby the diaphragm will be responsive to changes in the pressure of the circulating water. Thus, the diaphragm, which may be of rubber or any other suitable resilient material, will be moved as a result of changes in the pressure of the water which will, in turn, be dependent upon changes in the temperature of the water and hence changes in the temperature of the engine. The aforesaid push rod 14 would be directly connected to the diaphragm so as to be moved by the latter.

What I claim is:

1. A water pump and fan assembly for an engine comprising, in combination, a water pump body, an impeller spindle which extends through and is rotatable within said body, said spindle having therein an axial bore, a water pump impeller secured to said spindle, means on said spindle adapted to be driven from an engine, a freely rotatable fan for distributing cooling air around the engine, said fan being normally quiescent and having a hub in which is formed a non-circular hole, a push rod which is rotatable together with, but is slidable axially within the bore in the impeller spindle and has a leading end portion of a non-circular cross section for engagement within the complementary hole in the fan hub, the leading end of this portion of non-circular cross-section being substantially rounded, said apertured fan hub and leading end portion of the push rod constituting a dog clutch through which the fan can be driven, a temperature-responsive device adapted to be so arranged that water from the cooling system of the engine flows around it, and means connecting this device with the push rod whereby the fan can be connected for rotation together with the impeller spindle upon axial displacement of the push rod in one direction under the automatic control of said temperature-responsive device to engage it in the fan hub, and the fan can be disengaged from the impeller spindle upon axial movement of the push rod in the reverse direction under the automatic control of said temperature-responsive means to disengage it from the fan hub.

2. A water pump and fan assembly for an engine comprising, in combination, a water pump body, an impeller spindle which extends through and is rotatable within said body, said spindle having therethrough an axial bore, a water pump impeller secured to said spindle, means on said spindle adapted to be driven from an engine, a freely rotatable and normally quiescent fan for distributing cooling air around the engine, said fan having a hub in which is formed a hole of square cross-section, a bearing seated upon the front of the impeller spindle and upon which bearing the fan hub is rotatably mounted, a push rod which is rotatable together with, but is slidable axially within the bore in the impeller spindle and has a leading end portion of square cross-section for engagement within the complementary hole in the fan hub, the leading end of this portion of square cross-section being rounded, a thermostat which is arranged to rotate together with the pump impeller, said thermostat having a plunger adapted to be projected therefrom and withdrawn thereinto upon appropriate increases and decreases, respectively, of the temperature of water in the cooling system of the engine, and means connecting this plunger with the push rod whereby the fan can be connected for rotation together with the impeller spindle upon axial displacement of the push rod in one direction by the thermostat to project the said end portion of the push rod into the complementary hole in the fan hub, and the fan can be disconnected from the impeller spindle upon axial movement of the push rod in the reverse direction by the thermostat to withdraw the said end portion of the push rod from the hole in the fan hub depending on whether the engine exceeds or falls to a predetermined temperature respectively.

References Cited in the file of this patent

UNITED STATES PATENTS

| | | |
|---|---|---|
| 2,509,813 | Dineen | May 30, 1950 |
| 2,786,456 | Heiss | Mar. 26, 1957 |